United States Patent [19]
Gartner et al.

[11] Patent Number: 5,531,825
[45] Date of Patent: Jul. 2, 1996

[54] HYDRAULIC CEMENT SET ACCELERATORS BASED ON NITROALCOHOLS

[75] Inventors: Ellis M. Gartner, Silver Spring; Joseph A. Cogliano, Pasadena, both of Md.; Ahmad Arfaei, Chelmsford, Mass.; Leslie A. Jardine, Andover, Mass.; Paul Scheiner, Maynard, Mass.; Heyman C. Duecker, Chelmsford, Mass.

[73] Assignee: W. R. Grace & Co.-Conn., New York, N.Y.

[21] Appl. No.: 486,425

[22] Filed: Jun. 7, 1995

[51] Int. Cl.$^6$ ..................... C04B 24/12
[52] U.S. Cl. ............ 106/808; 106/696; 106/727; 106/819; 106/823
[58] Field of Search .................. 106/727, 696, 106/808, 819, 823

[56] References Cited

U.S. PATENT DOCUMENTS

| | | | |
|---|---|---|---|
| 4,116,706 | 9/1978 | Previte | 106/819 |
| 5,232,497 | 8/1993 | Dillenbeck et al. | 106/808 |
| 5,326,396 | 7/1994 | Abdelrzig et al. | 106/819 |
| 5,340,385 | 8/1994 | Arfaei et al. | 106/819 |
| 5,348,583 | 9/1994 | Arfaei et al. | 106/819 |
| 5,389,143 | 2/1995 | Abdelrazig et al. | 106/823 |

*Primary Examiner*—Karl Group
*Assistant Examiner*—Michael Marcheschi
*Attorney, Agent, or Firm*—Craig K. Leon; William L. Baker; Nicholas P. Triano, III

[57] ABSTRACT

Hydraulic cement set-accelerating admixture compositions; cement compositions containing such admixtures; and methods for preparing said cement compositions. The admixture compositions comprise one or more nitroalcohols present in an amount effective to increase the set acceleration of a hydraulic cement composition. The invention further relates to a method of making a hydraulic cement composition comprising adding to a cement composition comprising a hydraulic cement binder, a nitroalcohol component in an amount effective to increase the set-acceleration of the binder, and to a cement composition comprising a hydraulic cement binder and a nitroalcohol set-accelerating agent.

9 Claims, 5 Drawing Sheets

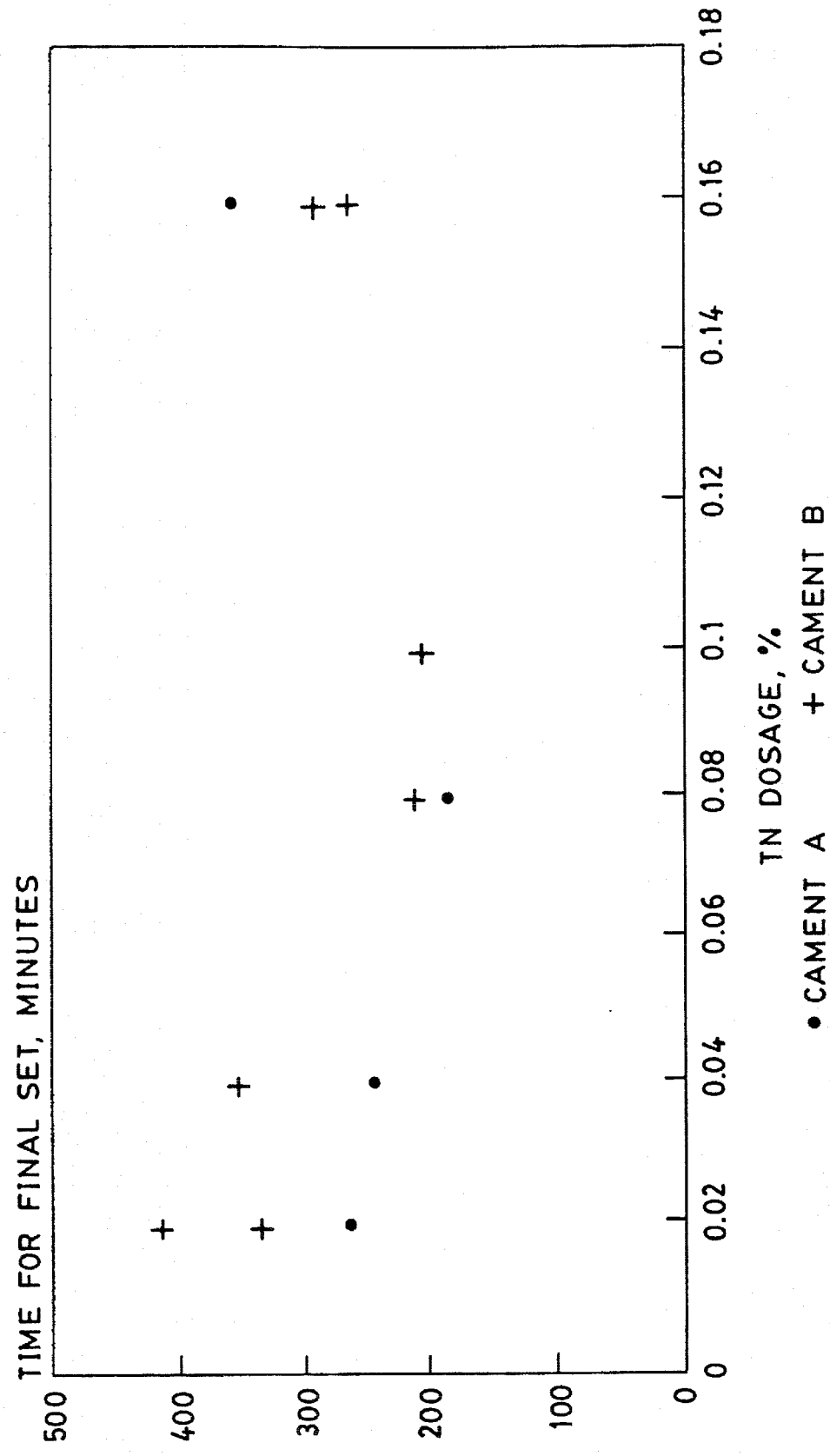

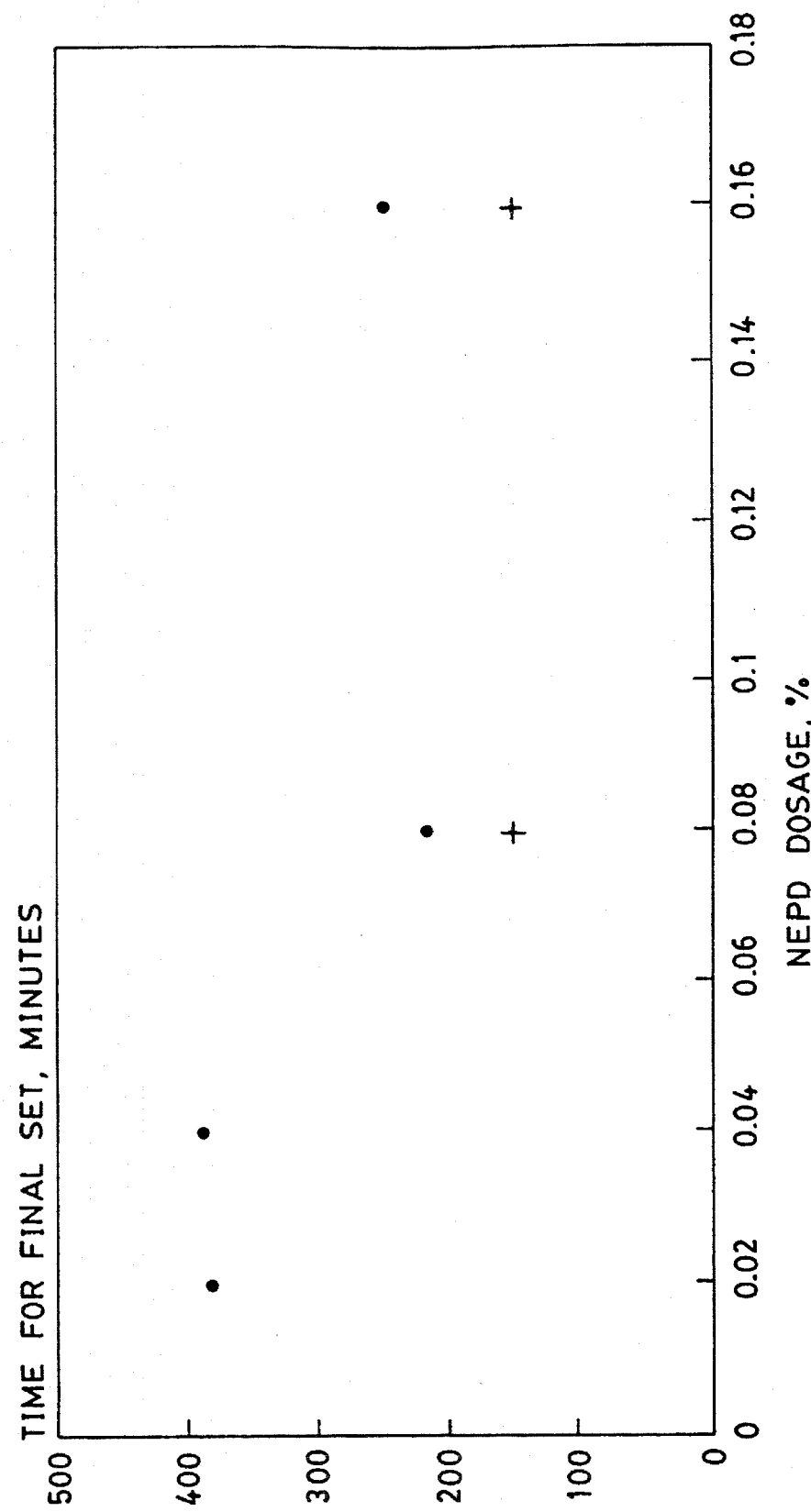

5,531,825

HYDRAULIC CEMENT SET ACCELERATORS BASED ON NITROALCOHOLS

FIELD OF THE INVENTION

This invention relates to admixture compositions for hydraulic cement compositions such as mortars, grouts and concretes. More particularly, the invention relates to novel set-accelerating admixtures and methods for set-acceleration, especially under low temperature conditions, employing the addition of nitroalcohols.

BACKGROUND OF THE INVENTION

Set accelerators are used to speed up the setting of hydraulic cement mixes so that the work can be finished quickly, such as for example when it is necessary to work with hydraulic cement compositions at freezing or near-freezing temperatures. The rate of hydration of Portland cement is very dependent on temperature, such that, at lower temperatures, Portland cement compositions will often set at a rate slower than desired unless the setting process is accelerated.

A variety of techniques have been used to accelerate the setting of hydraulic cement mixes in order to overcome the extended time required for hardening of such mixes under a variety of application conditions. Some techniques for accelerating the set are: increasing the proportion of cement in the mix, heating the mix, and using chemical admixtures that act, catalytically or otherwise, on the components of the mix to increase the rate at which the cement paste sets.

Several chemical set accelerators for hydraulic cement-based compositions are well known. They include alkali hydroxides, silicates, fluorosilicates, calcium formate, sodium chloride, calcium chloride, calcium nitrate and calcium nitrite. Calcium chloride is widely used because it is easy and inexpensive to produce and its effects on hydraulic cement are predictable and well-documented. However, like sodium chloride, it has the disadvantage of corroding reinforcing steel embedded in or in contact with the calcium chloride-containing concrete. Other drawbacks of calcium chloride include reduced compressive strength at later ages, reduced response to air entrainment, and blotching of hardened concrete surfaces (Concrete Admixtures, Dodson: Van Nostrand Reinhold, 1990).

Other set accelerating agents which do not have the disadvantage of corroding metal are also known. However, these agents exhibit only a small degree of influence on the rate of hardening and do not provide pronounced improvement in the initial low temperature set time of cement compositions. Examples of such non-corrosive agents include urea-formaldehyde condensates, melamine-formaldehyde condensates, as well as the inorganic salts of formic acid, thiocyanic acid, nitric acid, and carbonic acid. Thus, commonly used chloride-free set accelerators for Portland cement concretes are based on calcium nitrate and an organic component typically consisting of an amine-aldehyde adduct. It is desirable to also include nitrites in such formulations in order to provide corrosion inhibition and strength gain, but nitrites react with amine-aldehyde adducts to form nitrosamines, which are highly carcinogenic.

It is thus an object of the present invention to provide new set-accelerating admixtures which reduce the set time of hydraulic cement compositions without inducing or promoting corrosion of steel reinforcement.

It is a further object of this invention to provide non-corrosive set-accelerating admixtures which function well at low temperature in order to permit construction of concrete structures to proceed at an acceptable pace during cold climate conditions.

It is a still further object of the present invention to provide non-corrosive set-accelerating admixtures which can be used in combination with other admixtures which are known to cause retardation of the initial set and early strength properties of hydraulic cement-based compositions, in order to overcome the retardation effect of such other admixtures.

Further objects of the invention are to provide methods for preparing such cement compositions and to provide methods for reducing the set time of hydraulic cement compositions.

SUMMARY OF THE INVENTION

The problems of the prior art have been overcome by the present invention, which provides new hydraulic cement set-accelerating admixture compositions; cement compositions containing such admixtures; and methods for preparing said cement compositions. The admixture compositions comprise one or more nitroalcohols present in an amount effective to increase the set acceleration of a hydraulic cement composition. The invention further relates to a method of making a hydraulic cement composition comprising adding to a cement composition comprising a hydraulic cement binder, a nitroalcohol component in an amount effective to increase the set-acceleration of the binder, and to a cement composition comprising a hydraulic cement binder and a nitroalcohol set-accelerating agent.

BRIEF DESCRIPTION OF THE DRAWINGS

FIG. 1a is a graphical representation of the effect of tris (hydroxymethyl) nitromethane on setting time;

FIG. 1c is a graphical representation of the effect of 2-nitro-2-ethyl-propanediol on setting time;

DETAILED DESCRIPTION OF THE INVENTION

Figure 1B:
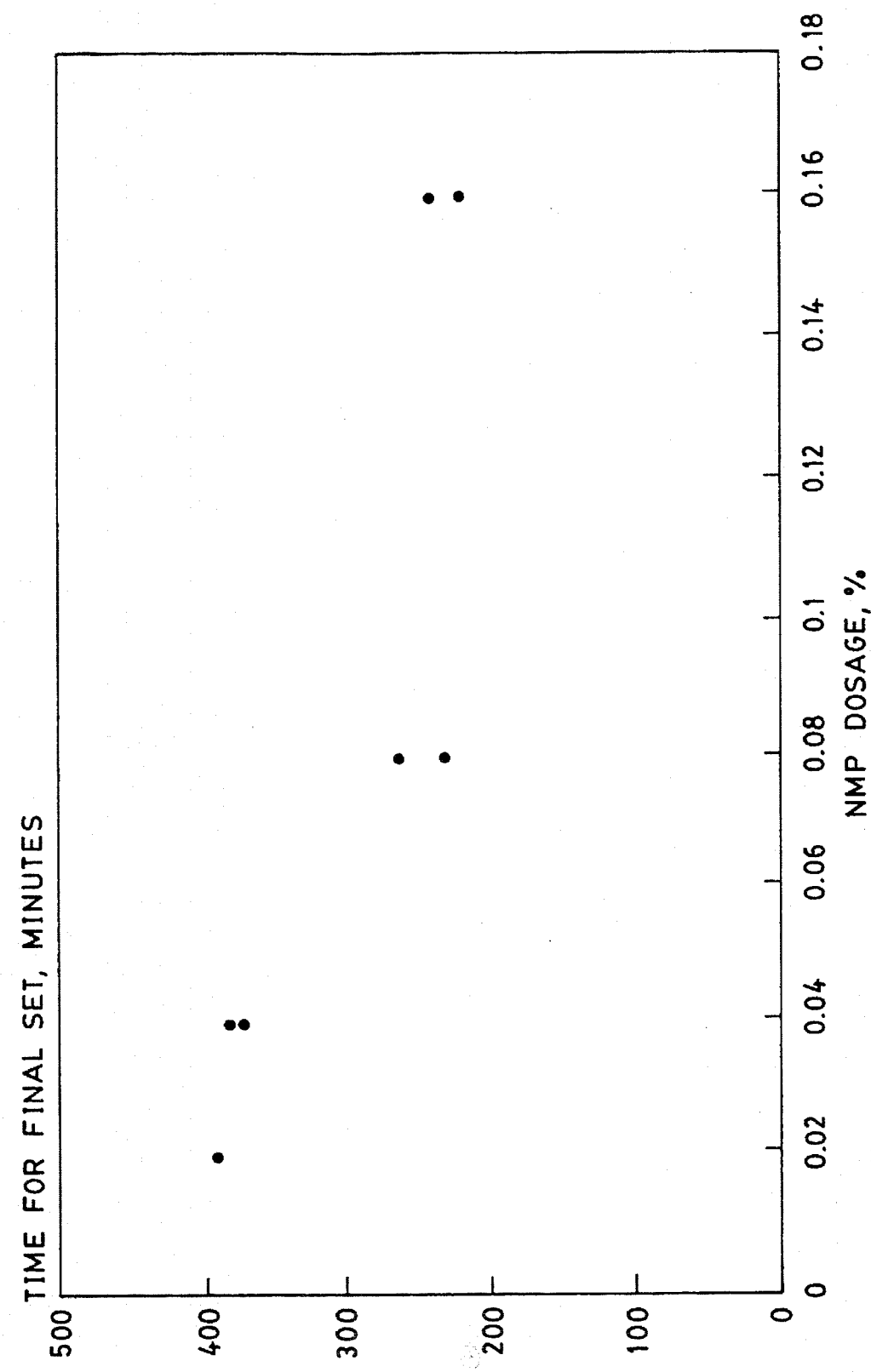
FIG. 1b is a graphical representation of the effect of 2-nitro-2-methyl-1-propanol on setting time.

Conventional accelerators have a limitation on how much set time or strength enhancement they can impart to concrete that is cured at low temperatures. The present invention provides cold concrete set accelerators that are significantly more robust in their performance in concrete. Although the set accelerators of the present invention are also operable at higher temperatures, they find particular utility at temperatures from just above the freezing point of the concrete to about 60° F. For example, the set accelerators of the present invention allow producers to ship concrete at 35° F. while still obtaining the setting characteristics of warmer concrete.

The term "cement composition" as used herein refers to pastes, mortars and concrete compositions comprising a hydraulic cement binder. The above terms are terms of art. Pastes are mixtures composed of a hydraulic cement binder, such as Portland cement, either alone or in combination with fly ash, silica fume or blast furnace slag, and water; mortars are pastes additionally including fine aggregate such as sand, and concretes are mortars additionally including coarse aggregate such as gravel or crushed rock. Such compositions may additionally include other admixtures such as defoaming agents, air-entraining or detraining agents, strength enhancers, water reducing agents, superplasticizers, and other components known to those skilled in the art for altering properties of the composition. The cement compositions of the present invention are formed by mixing required amounts of certain materials, e.g., a hydraulic cement, water, and fine or coarse aggregate, as may be applicable for the particular cement composition being formed.

The preferred admixture compositions of the present invention comprise one or more conventional set accelerator components and a nitroalcohol. Suitable conventional set accelerators include aluminum nitrate, calcium nitrate, calcium nitrite, calcium chloride, sodium thiocyanate, sodium chloride, calcium thiocyanate, calcium bromide, calcium formate and mixtures thereof. Suitable nitroalcohols include those of the formula (I):

wherein $X_1$ and $X_2$ are independently selected from —$CH_2OH$, —$NO_2$, —H, halogen, alkyl, aryl and —OH. Preferably the halogen is chlorine or bromine. The alkyl group must be one which does not cause the nitroalcohol to lose its water solubility. Preferably the alkyl group is a $C_1$–$C_6$ alkyl group, more preferably a $C_1$–$C_3$ alkyl group. Suitable nitroalcohols include 2-nitro-2-methyl-1-propanol, 2-nitro-2-ethyl-propanediol, tris(hydroxy-methyl) nitromethane, 2-bromo-2-nitro-1,3-propanediol, and nitroethanol. The nitroalcohols 2-nitro-2-methyl-1-propanol and 2-nitro-2-ethylpropanediol are preferred.

The nitroalcohol should be used in amount of 0.01 to 1% s/c (solid/cement), preferably 0.02 to 0.2% s/c, most preferably about 0.04–0.1% s/c to obtain optimum set acceleration enhancement. Mixtures of nitroalcohols in these amounts also can be used. As the total amount of nitroalcohol exceeds 0.2% s/c, little or no added benefit is seen. This is in contrast to conventional salt-type set accelerators, which result in added benefit as concentrations increase, and which tend to reach a plateau only at much higher levels. The conventional set accelerator can be used in the usual amounts necessary for effective set acceleration, generally in the range up to about 4.0% s/s, preferably 0.5–2% s/s. The nitroalcohols also can be used without a conventional set accelerator.

In one embodiment of the present invention, the separate addition of the nitroalcohol to the cement composition can be delayed with little or no negative effect. Delayed addition of up to 60 minutes can be employed while still retaining set accelerating properties of the nitroalcohol.

Certain of the nitroalcohols, such as 2-nitro-2-methyl-1-propanol, can be obtained in dry pellet form. In certain applications, it may be desirable to add such nitroalcohols as a dry or packaged granular product. Such dry or packaged granular products can include fine amorphous silicas such as silica fume or other fine mineral powders in amounts from about 3 to about 15% based upon the weight of cement to obtain strength enhancement. The dry or packaged granular product can also contain other additives, such as dispersants to adjust the slump. Similar formulations can be prepared as wet slurries using the other nitroalcohols that are not suitable in dry pellet form.

The following examples are given for illustrative purposes only.

EXAMPLE 1

2-nitro-2-methyl-1-propanol was formulated with calcium nitrate in a ratio of 1.5:8.0. Total solids of the formulation were adjusted to 36.0% with water. A blank was prepared containing no accelerator, and a control was prepared containing calcium nitrate alone at a dosage of 0.4% s/s.

This formulation was added to concrete mortar at a dosage of 0.475% s/s by weight of cement. The set time was measured at 40° F. according to ASTM C403. Mortar containing this formulation set in 5 hours 10 minutes earlier than the blank mortar, and 2 hour 6 minutes earlier than the control.

EXAMPLE 2

To a standard mix cooled to 5° C. containing Portland cement (100 parts), F95 fine quartz sand (106 parts) (46% passing #100 mesh), C109 graded quartz sand (42 parts), 14–28 mesh alumina (56 parts), and 8–14 mesh alumina (216 parts), was added 0.05 or 0.1 parts of 2-bromo-2-nitro-1,3-propanediol or tris (hydroxymethyl) nitromethane in water (59 parts) at 5° C. The cement had the following elemental analysis:

| Oxide | Cement |
|---|---|
| $Na_2O$ | 0.20 |
| $K_2O$ | 0.50 |
| MgO | 3.91 |
| CaO | 65.95 |
| $Al_2O_3$ | 4.16 |
| $Fe_2O_3$ | 2.88 |
| $SiO_2$ | 20.61 |
| $TiO_2$ | 0.44 |
| $P_2O_5$ | 0.00 |
| $SO_3$ | 2.98 |

The mixtures were stirred in an insulated jar for 5 minutes, resulting in a 6° temperature rise. The containers were placed in a 5° C. chamber and its set time determined by the time necessary for a pointed steel rod to resist penetration at a pressure of 700 psi. The results shown below show the set acceleration produced by these compounds:

TABLE 1

| % admixture | Addition | Set Time (minutes) |
|---|---|---|
| 0 | Blank | 500 |
| 0.05 | 2-bromo-2-nitro-1,3-propanediol | 317 |
| 0.1 | 2-bromo-2-nitro-1,3-propanediol | 303 |
| 0.05 | tris (hydroxymethyl) nitromethane | 347 |

EXAMPLE 3

To the mortars of Example 2 containing calcium nitrite (CANI), calcium nitrate (CANA) and sodium thiocyanate (NaSCN) at various dosages, 0.1% tris(hydroxymethyl)nitromethane (TN) was added by the same method described in Example 2. The results are shown below in Table 2:

TABLE 2

Acceleration by formulations containing 0.1% tris(hydroxymethyl)nitromethane (TN)

| | FINAL SET TIMES, HOURS | | |
|---|---|---|---|
| Conc. % s/c | CANI | CANI + .2% NaSCN | CANA |
| 0[(2)] | 5.1 | — | 6.4 |
| .5[(2)] | 3.8 | — | 3.2 |
| 1.0[(2)] | 3.1 | 3.0 | 2.6 |

TABLE 2-continued

Acceleration by formulations containing 0.1%
tris(hydroxymethyl)nitromethane (TN)

| | FINAL SET TIMES, HOURS | | |
|---|---|---|---|
| Conc. % s/c | CANI | CANI + .2% NaSCN | CANA |
| 2.0[(2)] | 2.2 | 3.5 | 2.6 |
| Blank (No TN) | 8.0 | — | — |
| 2% (No TN) | 4.3 | 3.9 | 3.4 |

[(2)]All samples contain 0.1% TN.

The addition of tris(hydroxymethyl)nitromethane increased the set acceleration in all instances. Controls at both 0% and 2% calcium salt concentrations show set acceleration by TN, supporting the view that it enhances set acceleration even in the absence of the salt-type accelerators.

EXAMPLE 4

The same procedure as Example 3 was carried out, except that nitroethanol (2-nitroethane-1-ol) was used instead of tris(hydroxymethyl)nitromethane. The results are shown below in Table 3:

TABLE 3

| Conc., % s/c | Final Set Time, Hrs. |
|---|---|
| .01 | 9.2,8.4 |
| .02 | 8.6 |
| .05 | 6.9,4.7 |
| .1 | 3.7,4.3 |
| .2 | 2.8 |
| Blank | 9.3 |

The data show that set time shortens with increasing nitroethanol dosages up to 0.2%, which is higher than the preferred dosage range for tris(hydroxymethyl)nitromethane.

EXAMPLE 5

Mortars were prepared, in accordance with the same procedure described above, using mixtures of calcium nitrate and calcium sulfamate as the conventional salt accelerator, plus various dosages of tris(hydroxymethyl)nitromethane. The results are shown below in Table 4, with setting time shown in hours:

TABLE 4

| TN Dosage, % | Calicum sulfamate dosage, % | | | |
|---|---|---|---|---|
| | 0.0 | 0.2 | 0.5 | 1.0 |
| Total dosage = 1.0% | | | | |
| 0.00 | 5.6 | 7.7 | 7.8 | 7.3 |
| 0.05 | 3.5 | 3.2 | 2.8 | |
| 0.10 | 3.1 | 3.4 | 3.0 | |
| 0.20 | 4.1 | 6.7 | 9.2 | |
| Total dosage = 2.0% | | | | |
| 0.00 | 4.4 | 3.0 | 4.8 | 5.7 |
| 0.05 | 2.8 | 3.0 | 2.2 | 2.7 |
| 0.10 | 2.4 | 3.1 | 2.3 | 2.7 |
| 0.20 | 7.7 | 7.9 | 8.1 | 5.3 |

Note:
Control values (average of 4 runs)
blank = 7.6 hrs ± 0.7

Most of these mixes show an optimum set acceleration at about 0.05–0.10% tris(hydroxymethyl)nitromethane, with higher dosages being less effective.

EXAMPLE 6

Using the same procedures as given in Example 2, setting times were obtained for mortars made using two different ordinary Portland cements with a constant 1% s/c (solids/cement) dosage of calcium nitrate (CANA), plus various different dosages of tris(hydroxymethyl)nitromethane. The elemental oxide analysis (% by mass) of these two cements was as follows:

| Oxide | Cement A | Cement B |
|---|---|---|
| $Na_2O$ | 0.08 | 0.01 |
| $K_2O$ | 0.59 | 0.32 |
| MgO | 0.71 | 3.03 |
| CaO | 64.51 | 58.99 |
| $Al_2O_3$ | 4.36 | 4.63 |
| $Fe_2O_3$ | 3.43 | 4.70 |
| $SiO_2$ | 21.40 | 19.80 |
| $TiO_2$ | 0.18 | 0.34 |
| $P_2O_5$ | 0.03 | 0.00 |
| $SO_3$ | 2.85 | 2.30 |

The results are shown graphically in FIG. 1a. They indicate that, under these conditions, the optimum dosage of tris(hydroxymethyl)nitromethane (i.e., the dosage that gives the shortest setting time) is about 0.08% s/c.

EXAMPLE 7

The procedure of Example 6 were carried out, except that 2-nitro-2-methyl-1-propanol was used instead of tris (hydroxymethyl) nitromethane, and cement C having the following elemental analysis was used:

| Oxide | Cement C |
|---|---|
| $Na_2O$ | 0.20 |
| $K_2O$ | 0.44 |
| MgO | 4.18 |
| CaO | 62.21 |
| $Al_2O_3$ | 4.07 |
| $Fe_2O_3$ | 3.40 |
| $SiO_2$ | 21.11 |
| $TiO_2$ | 0.44 |
| $P_2O_5$ | 0.00 |
| $SO_3$ | 2.25 |

The results are shown graphically in FIG. 1b, and indicate that 0.08% s/c was the optimum dosage of the nitroalcohol, although higher dosages gave similarly short setting times.

EXAMPLE 8

The procedure of Example 7 were carried out, except that 2-nitro-2-ethyl-propanediol was used as the nitroalcohol with two different calcium nitrate dosages (1% and 2%). The results are shown graphically in FIG. 1c, and indicate that the optimum nitroalcohol dosages was about 0.08% s/c.

EXAMPLE 9

Figure 2A:
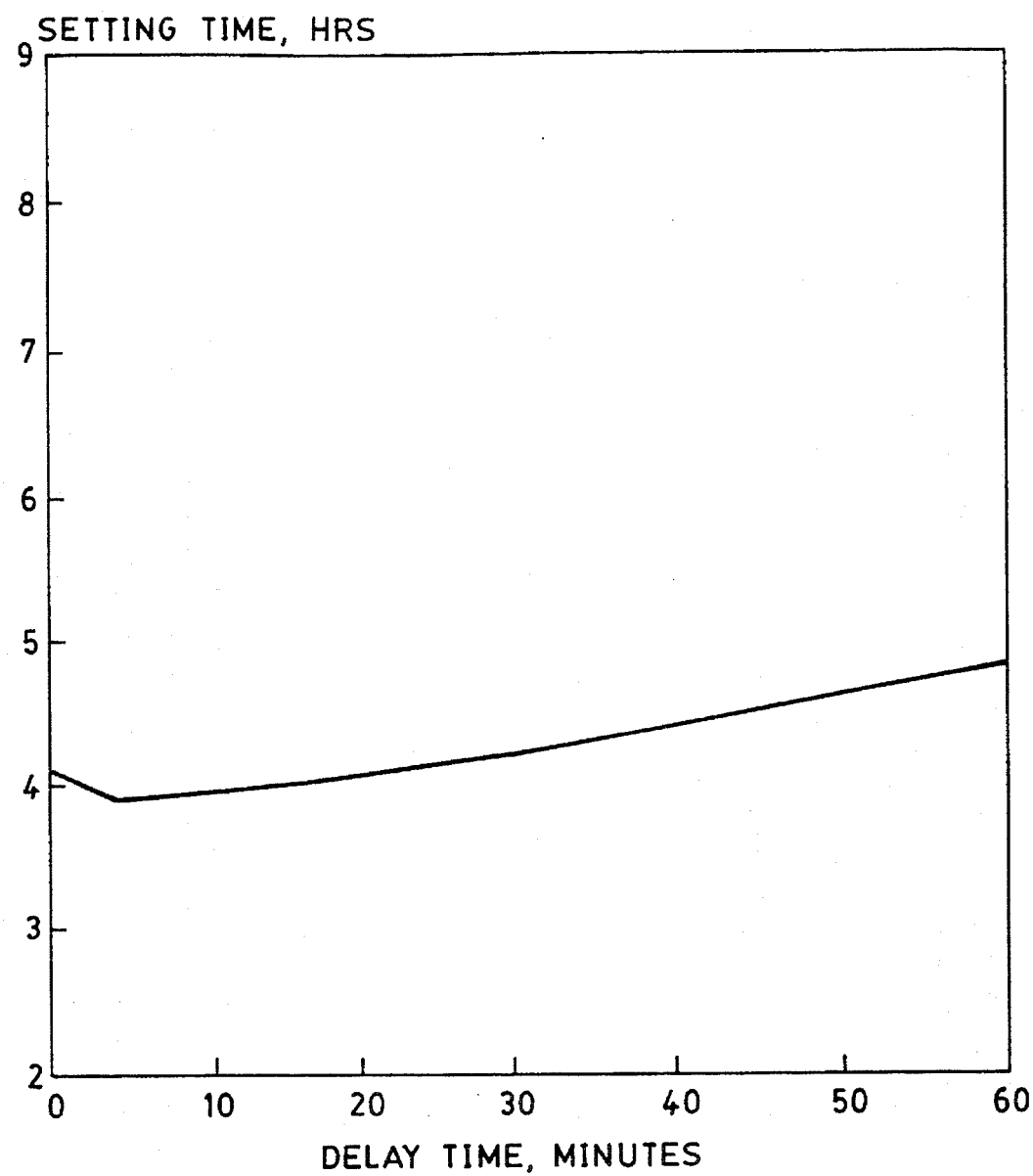
FIG. 2a is a graphical representation of the effect of delayed addition of 2-nitro-2-ethyl-propanediol on set time.
Figure 2B:
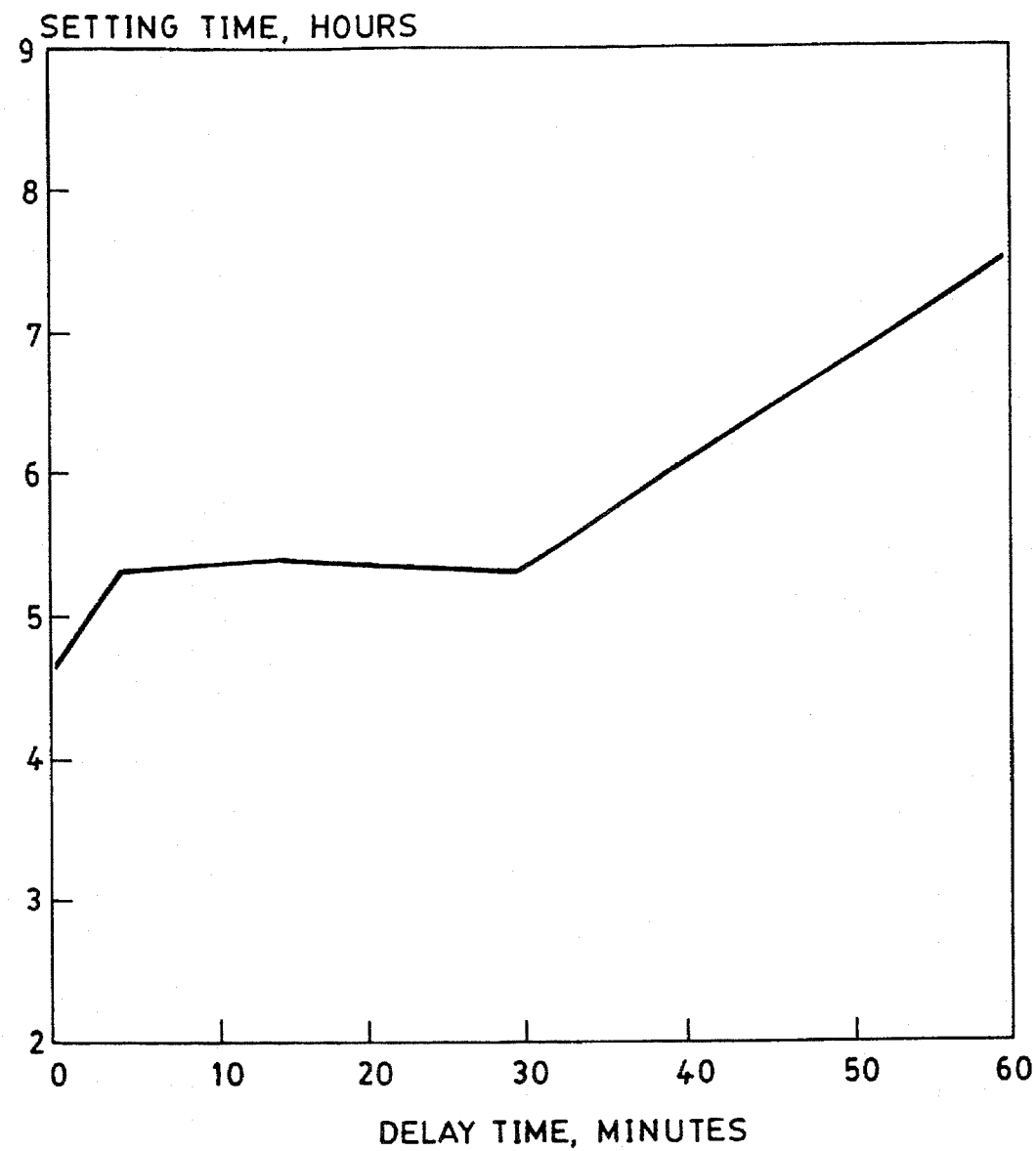
FIG. 2b is a graphical representation of the effect of delayed addition of 2-nitro-2-ethyl-propanediol on set time.

Experiments were run using the same procedure as set forth in Example 2, except that the nitroalcohol was added to the mix some time after the mixing procedure had been started. The elapsed time between the start of mixing and the addition of the nitroalcohol to the mix is referred to as the "delay time". Mortars were mixed using cement D (FIG. 2a)

and cement B (FIG. 2b), in both cases with the incorporation of 1% s/c calcium nitrite (CANI) as a conventional set accelerator. The elemental analysis of cement D is shown below:

| Oxide | Cement D |
|---|---|
| $Na_2O$ | 0.45 |
| $K_2O$ | 0.28 |
| MgO | 2.73 |
| CaO | 60.95 |
| $Al_2O_3$ | 3.77 |
| $Fe_2O_3$ | 2.19 |
| $SiO_2$ | 21.59 |
| $TiO_2$ | 0.30 |
| $P_2O_5$ | 0.00 |
| $SO_3$ | 2.55 |

2-nitro-2-ethyl-propanediol was added at a dosage of 0.08% s/c during mixing to determine whether the delay time influenced its effect as a set accelerator. The results are shown graphically in FIGS. 2a and 2b, and indicate no significant trend in set time with delay times up to 30 minutes.

What is claimed is:

1. A cement composition comprising a hydraulic cement binder and a set accelerating amount of a nitroalcohol.

2. The cement composition of claim 1, wherein said nitroalcohol is a compound of the formula (I):

(I)

wherein $X_1$ and $X_2$ are independently selected from —$CH_2OH$, —$NO_2$, —H, —Cl —Br, $C_1$-$C_6$ alkyl, aryl and —OH.

3. The cement composition of claim 1, wherein said nitroalcohol is selected from the group consisting of 2-nitro-2-methyl-1-propanol, 2-nitro-2-ethyl-propanediol, tris(hydroxymethyl) nitromethane, 2-bromo-2-nitro-1,3-propanediol and nitroethanol.

4. A cement composition comprising a hydraulic cement binder; a set accelerating amount of a set-accelerator selected from the group consisting of aluminum nitrate, calcium nitrate, calcium nitrite, calcium chloride, sodium thiocyanate, sodium chloride, calcium thiocyanate, calcium bromide, calcium formate and mixtures thereof; and a set accelerating amount of a nitroalcohol.

5. The cement composition of claim 4, wherein said nitroalcohol is a compound of the formula (I):

(I)

wherein $X_1$ and $X_2$ are independently selected from —$CH_2OH$, —$NO_2$, —H, —Cl —Br, $C_1$-$C_6$ alkyl, aryl and —OH.

6. The cement composition of claim 4, wherein said nitroalcohol is selected from the group consisting of 2-nitro-2-methyl-1-propanol, 2-nitro-2-ethyl-propanediol, tris(hydroxymethyl) nitromethane, 2-bromo-2-nitro-1,3-propanediol and nitroethanol.

7. A method of accelerating the set of a cement composition comprising adding to a hydraulic binder a set accelerator selected from the group consisting of aluminum nitrate, calcium nitrate, calcium nitrite, calcium chloride, sodium thiocyanate, sodium chloride, calcium thiocyanate, calcium bromide, calcium formate and mixtures thereof; and within about 60 minutes of said addition, adding a nitroalcohol thereto.

8. The method of claim 7 wherein said nitroalcohol is a compound of the formula (I):

(I)

wherein $X_1$ and $X_2$ are independently selected from —$CH_2OH$, —$NO_2$, —H, —Cl —Br, $C_1$-$C_6$ alkyl, aryl and —OH.

9. The method of claim 7, wherein said nitroalcohol is selected from the group consisting of 2-nitro-2-methyl-1-propanol, 2-nitro-2-ethyl-propanediol, tris(hydroxy-methyl) nitromethane, 2-bromo-2-nitro-1,3-propanediol and nitroethanol.

* * * * *